Dec. 9, 1924.
F. F. SEWELL
1,518,677
APPLICATION CYLINDER AIR RELEASE VALVE FOR AIR BRAKE EQUIPMENT
Filed Jan. 2, 1924
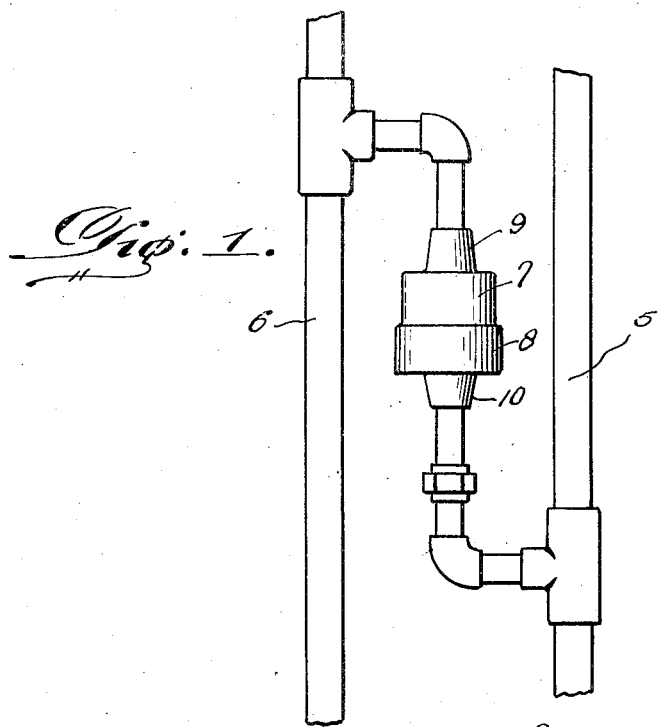
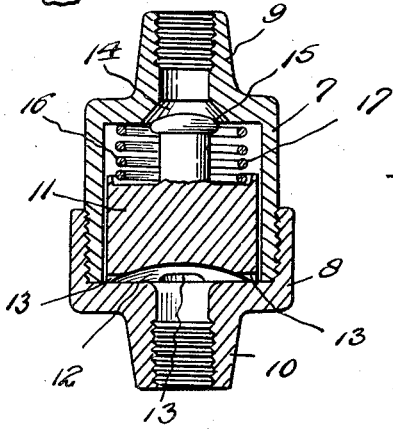
Frank F. Sewell, Inventor
By Clarence A. O'Brien, Attorney Patented Dec. 9, 1924.

1,518,677

UNITED STATES PATENT OFFICE.

FRANK F. SEWELL, OF PARKERSBURG, WEST VIRGINIA.

APPLICATION-CYLINDER AIR-RELEASE VALVE FOR AIR-BRAKE EQUIPMENT.

Application filed January 2, 1924. Serial No. 684,009.

*To all whom it may concern:*

Be it known that I, FRANK F. SEWELL, a citizen of the United States, residing at Parkersburg, in the county of Wood and State of West Virginia, have invented certain new and useful Improvements in Application-Cylinder Air-Release Valves for Air-Brake Equipment, of which the following is a specification.

This invention relates to valves, and has more specific relation to valves for use in conjunction with air brake equipments, the same being primarily adapted for installation between the application cylinder pipe and the distributing valve release pipe, for preventing the air from backing up in the application cylinder and ultimately causing great damage to the brake shoes and tires.

In the running position of the brake equipment there is a direct air passage from the application cylinder and application chamber to the atmosphere through the equalizing slide valve and the independent and automatic brake valves. It is well known to those skilled in the air brake art, that during the normal running position of the different devices of an air brake equipment, the equalizing slide valve undergoes the great disadvantage of, what is termed in the art, creeping on. This creeping on of said slide valve breaks the passage between the application cylinder and application chamber. The air is then permitted to leak through the equalizing slide valve into the application cylinder causing a slight movement of the application piston which opens to a limited degree the application valve which thereby allows a certain amount of the air in the main reservoir to pass to the brake cylinder. It is therefore obvious, and well known, that due to this leakage, which is caused by the creeping on of the equalizing slide valve, the brakes are partially applied.

This application of the brakes is so slight as not to materially interfere with the operation of the train, and is very rarely noticed by even the engineer himself. However, the brake shoes and tires will become quickly heated, which will cause them to expand and come loose, which oftentimes results in great damage to both life and property, and always results in unexpected delays, in order that the tires and shoes may be properly repaired or renewed.

It is therefore the primary object of the invention to provide a means for establishing communication between the application cylinder pipe and the distributing valve release pipe. This allows the air to pass into the valve release pipe and then from the same into the application cylinder pipe and eventually out through the exhaust of the automatic brake valve. It will thus be seen that the air will be prevented from entering the application cylinder and producing the disadvantageous results above set forth.

An additional object of the invention is to provide a valve to be used in the above set forth capacity, whereby the nature of the same is such as to immediately automatically close upon the application of the brake actuating valve, or whenever the air pressure reaches a predetermined degree.

In the drawing wherein there is shown but a single means whereby the present invention may be carried out and wherein like reference characters correspond throughout both of the views, Figure 1 is a side elevational view of this means in its actual use, and Figure is a detail vertical sectional view of this means per se.

Now having specific reference to the drawing, 5 designates the usual application cylinder pipe and 6 the usual distributing valve release pipe of a well-known form of air brake equipment for locomotives or cars. The pipe 5, as is well known, communicates at its upper end with both the automatic and independent brake valves of the equipment and at its lower end with the equalizing valve of the distributing valve mechanism, whereby when either of the brake valves are applied the air will pass through said distributing mechanism and thence to the brake cylinders.

The pipe 6 communicates at its lower end with both the application chamber and application cylinder of the distributing valve, and serves as a means for carrying off the air leakage from the distributing valve through the independent and automatic brake valve and finally through the exhaust opening of the automatic brake valve.

However, as hereinbefore set forth, the equalizing slide valve of the distributing valve mechanism will creep on, and break the communication between the application cylinder and application chamber, for thereby preventing the air leakage from properly discharging to the release pipe 6. The air cannot discharge to the application cylinder pipe and it will therefore positively back up in application cylinder and produce the disadvantageous results above set forth.

As shown in the drawing but one means whereby communication is established between the application cylinder pipe and distributing valve release pipe, and wherein the nature of the same is to immediately automatically close upon the application of the independent or automatic brake valve, or whenever the air leakage reaches a predetermined pressure for thereby permitting the brakes to be applied. I do not wish to be limited to the structure of the valve disclosed in the drawing, because in the future practice of the invention, widely varying forms of valves may be used in the carrying out of this invention.

In the embodiment shown the valve comprises a casing 7 open at one end and externally screw-threaded for the reception of a cap 8. The other end of the casing is formed with an outlet nipple 9 whereby the same may be placed into communication with the distributing valve release pipe 6. The cap 8 is formed with an inlet nipple 10 for connection with the application cylinder pipe 5.

Within the casing is a plunger 11 of slightly lesser diameter than that of the casing so as to allow a free sliding movement thereof. The bottom side of this plunger is dished as at 12 and is formed at the edge of this dished portion with slots 13 for allowing the air leakage to pass within the casing around the outer side of the plunger and thence through the outlet 9 into the distributing valve release pipe 6.

The inner end of the discharge nipple 9 of the casing 7 is so formed as to provide a valve seat 14 for the reception of a valve 15 upon the upper end of a stem 16 that is formed centrally upon the top side of the plunger 11. The top side of this plunger is formed at its edge with a vertical flange 17 within which sets the lower end of an expansible coiled spring 18. The upper end of this spring engages the top wall of the casing and serves as a means for normally preventing the raising of the plunger 11 and the consequent closing of the air passage between the pipes 5 and 6 of the air brake equipment.

The pressure of the spring is preferably not greater than ten pounds and it will thus be seen that air leakage up to a pressure slightly greater than ten pounds will be allowed to escape into the distributing valve release pipe 6 and thence to the atmosphere through the automatic brake valve.

However, immediately upon the application of the independent or automatic brake valves, or in the event that the air leakage becomes too great, the plunger will be forced upwardly within the casing for consequently seating the valve element 15 and thereby preventing the escape of air. The distributing valve will then be properly operated and the brakes applied.

From the foregoing, it will at once be appreciated by those skilled in the art to which the present invention pertains, that I have provided a highly novel and efficient means for preventing the air leakage in an air brake equipment from backing up into the application cylinder of the distributing valve mechanism and this especially when the equalizing valve has undergone the effect of creeping on, but as above set forth, I do not wish to be limited to any specific structural valve for accomplishing this purpose, as in the future practice of the invention, widely varying forms of mechanisms may be used in the carrying out of the invention.

Having thus described my invention, what I claim as new, and desire to secure by Letters Patent is:—

An air release valve for air brake equipment, wherein the air brake equipment includes a distributing valve mechanism, the application cylinder of which is in open communication with the distributing valve release pipe, when said equipment is in running position, and wherein the equalizing slide valve creeps and closes the original passage, and effects a partial application of the brake; comprising a valve housing having pipe connections at opposite ends with the application cylinder and distributing valve release pipe respectively, a plunger mounted in the body for reciprocating movement having a concaved face on one end thereof, and a projection on the other end formed with a valve head for engagement with a valve seat formed in the end of the casing; said plunger being formed with slots to permit the passage of air through the casing, and means for normally holding the valve head off of the seat, whereby a predetermined small amount of air pressure is permitted to pass through the casing from the application cylinder to the distributing valve release pipe, to prevent creeping of the distributing valve, and a greater air pressure operates the plunger in the casing, to close the passage therethrough.

In testimony whereof I affix my signature.

FRANK F. SEWELL.